United States Patent [19]

Stanwick

[11] 3,907,017
[45] Sept. 23, 1975

[54] INTERFERING THREAD FORM
[76] Inventor: Glenn W. Stanwick, 1325 Valley Ridge Dr., Brookfield, Wis. 53005
[22] Filed: Sept. 30, 1974
[21] Appl. No.: 510,315

[52] U.S. Cl. .................................. 151/22; 85/46
[51] Int. Cl.² ........................................ F16B 39/30
[58] Field of Search .................. 151/22, 14 R; 85/46

[56] References Cited
UNITED STATES PATENTS

| | | | |
|---|---|---|---|
| 2,788,046 | 4/1957 | Rosan | 151/22 |
| 3,248,747 | 5/1966 | Scott | 85/46 |
| 3,301,299 | 1/1967 | Stanwick | 151/22 |
| 3,342,234 | 9/1967 | Evans | 151/22 |
| 3,381,733 | 5/1968 | Stanwick | 151/22 |
| 3,520,343 | 7/1970 | Evans | 151/22 |
| 3,794,092 | 2/1974 | Carlson et al. | 151/22 |

*Primary Examiner*—Marion Parsons, Jr.
*Attorney, Agent, or Firm*—James E. Nilles

[57] ABSTRACT

A self-locking threaded means such as a male member adapted to be threadably engaged in a female member, the male member having three zones, an initial engaging zone, a second zone which causes interference between the threaded male and female members so as to deform the threads of the female member, and a third zone which is a holding zone and which results from the deforming action in the second zone to form a tight fit between the members. The second zone is a transitional zone from the first zone to the third zone and in which second zone the root diameter of the male member progressively increases and at the same time the increasing root diameter has waves formed therein and which permit the necessary build up of interference between the members over a shorter axial length of the members. The amount of increase of the root diameter of the third zone is determined by a percentage of the pitch of the threads being used.

4 Claims, 3 Drawing Figures

INTERFERING THREAD FORM

BACKGROUND OF THE INVENTION

The invention pertains to threaded fasteners such as studs or bolts and is of the type having an interfering threaded fit which, due to cold working of one of the interengaging members, results in locking engagement of the members.

An example of the type of device over which the present invention is an improvement is shown in my U.S. Pat. No. 3,301,229 issued Jan. 31, 1967 and entitled "Intefering Thread Form." In that patent, a male member is disclosed having a second zone of threads which forms a transitional zone between the initial zone and the third locking zone. The transitional second zone shown and described in that patent has a root diameter that is flattened and progressively increases from the first to third zones whereby, as the male member is threaded into the female member, the crests of the female member are deformed and cold worked so as to precisely fit and fill the space between the threads of the third zone of the male member. As a result, the interengaging threads in third zone fit tightly together to lock the members against relative rotation. As taught in that patent, the amount of interference between the members in the second zone depend on the number of convolutions in the second zone, that is to say, with a fewer number of convolutions, less interference can be utilized, but using a greater number of convolutions in the second zone, a larger amount of interference or cold working is possible between the members.

The invention shown and described in that patent has proved to be highly successful, particularly in securely fastening together parts which are subjected to high frequency of vibration, such as parts in a jet engine of an aircraft.

Certain uses of this general type of fastener, however, have required a considerable amount of interference or cold working between the threaded members in a much shorter axial length of the members than have heretofore been possible.

SUMMARY OF THE INVENTION

The present invention provides an interfering threaded member having three zones, a first engaging zone, a second interfering zone or cold working zone, and a third holding zone. The second zone of interference on a male threaded member has a root diameter which not only increases as it approaches the third zone so that it provides the necessary cold working action on the crests of the female thread, but in addition, the said male thread in the secoind zone is formed, at least partially, as a wave pattern of gentle and gradual wave form. Such a particularly shaped root in the second zone of the male member permits a more rapid increase in the root diameter in the second zone and over a shorter axial length of the members. Stated otherwise, with the root of the second zone formed in an undulation or generally wave pattern, as the male member is threaded into the female member, the interference and cold working therebetween is alternately raised to a considerable amount and then relieved, and this alternate building up and releasing of the interference is repeated as the members are threaded together. The invention furthermore establishes the maximum limits of the root diameter in the third zone and which will prevent fatiguing of the metal, wiping out of the threads in the third zone and insuring that the members can be properly driven together. These maximum limits of the root diameter, that is the amount which can be added over and above the normal pitch diameter PD in zone 3, is a percentage of the pitch of the thread being used. It has been found that using a construction, it is possible to obtain more severe holding power over a shorter length of threads in the third zone.

These and other objects and advantages will appear hereinafter as this disclosure progresses, reference being made to its accompanying drawings.

DESCRIPTION OF A PREFERRED EMBODIMENT

Figure 1:
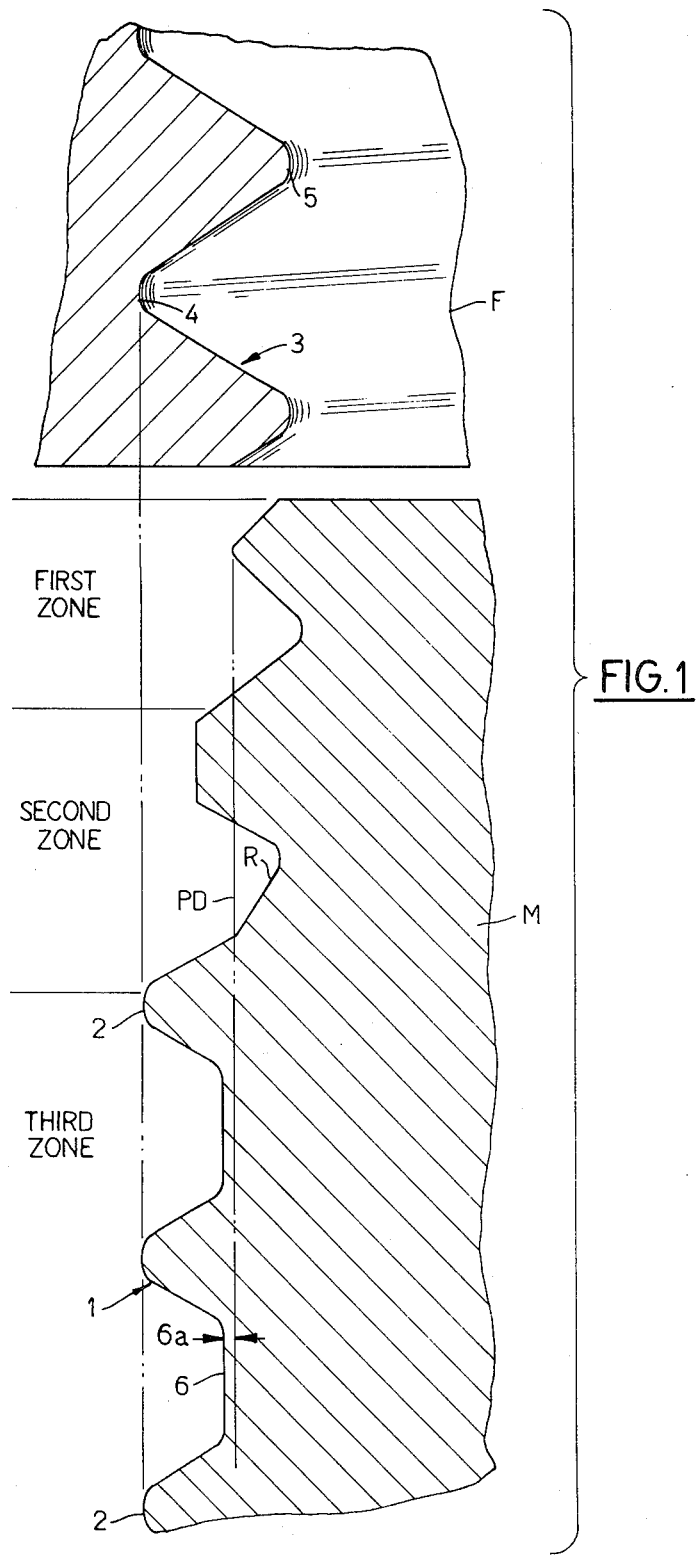
FIG. 1 is a fragmentary sectional view of one half side of a male thread member made in accordance with the present invention, the view being enlarged approximately 50 times from normal, the figure also including a fragment of a female member.
Figure 2:
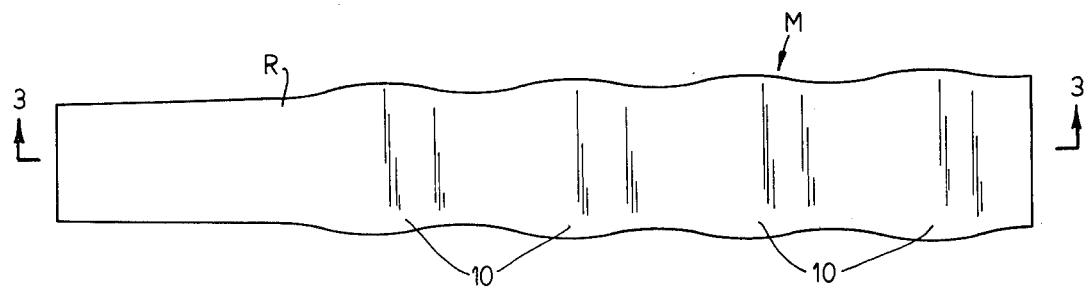
FIG. 2 is a flattened, or "spread out," elevational view of a thread root of a male member as shown in FIG. 1, second zone, according to the present invention, showing the wave pattern, exaggerated for clarity, in the root of the thread.
Figure 3:
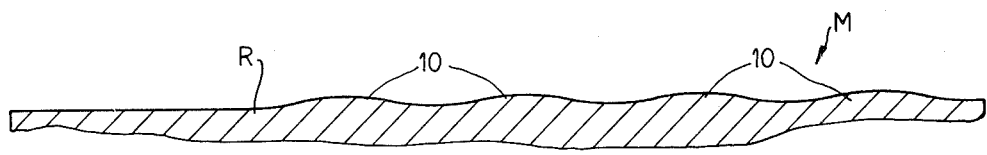
FIG. 3 is a sectional, fragmentary view taken generally along the line 3—3 in FIG. 2.

The present invention relates in general to interengaging threadable members of the self-locking type. For example, a male member M is of the type having an interference fit that acts to deform the threads of a female member F so that the finished threads of the female member then precisely and completely fill the space between the threaded members with no voids therebetween and they are firmly held together against accidental relative rotation.

More particularly, the invention relates to a male member M having a male thread 1 of constant axial pitch throughout the entire portion of its length. That is to say, with the exception of the initial entry end of the male member, its thread form has a uniform axial pitch and also has crests 2 of generally constant uniform diameter. The male thread member is adapted to be received in a female thread 3 which also has a corresponding axial pitch with roots 4 and crests 5 of substantially V-shape in cross section and of generally constant uniform diameter.

As taught in my said U.S. Pat. No. 3,301,299, the male member is provided with three zones, a first initial entry zone having a root of substantially V-shape in cross section. This first zone is shown in FIG. 1 and labelled as such, and is standard or conventional. The male member also has a second zone which has been labelled in FIG. 1 and this second zone has a root R which progressively increases in diameter as it extends from the first zone to the third zone. This root R is shown as being flat and the flat root can be inclined as shown, or it can be parallel to the axis of the male member. The third zone, as indicated in FIG. 1, has a root 6 and this third zone is known as the holding zone and it is in this zone that the deformed threads of the female member fill the space between the threads of the male member due to the fact that the crests of the female member have been deformed due to cold working which results from the interference caused in the second zone by the progressively increasing root diameter of the male member in the second zone.

As explained in my said patent, the amount of intereference in the second zone depends on the number of convolutions in the second zone. That is to say, if a greater number of convolutions and consequently a longer axial length is employed in the second zone, the amount of interference, that is, the amount of increase of the root diameter in the second zone could be greater than would be possible with fewer convolutions in the second zone.

Certain uses of this type of self-locking threaded means require sever holding power between the members over a shorter axial length then has heretofore been possible in the prior art holding devices, including that shown in my said patent.

In accordance with the present invention, I have found that by making the root of the male thread in its second zone with at least one undulation or wave 10, in addition to its progressively increasing diameter characteristic, it is possible to obtain greater interference (and consequent cold working between the members) over a substantially shorter axial length of the members.

The wave form may be imparted to the second zone of the male thread by providing a special grind or hand lapping on the thread forming tool as the threads are rolled, (as opposed to being cut chased). The resulting wave form in the second zone is of gentle and gradual undulation to accomplish deformation and cold working of the female thread form during its passage through the second zone and for accomplishing a greater locking force—constant in the third zone. In other words, the slight rise and fall due to the gentle and gradual threads in the second zone introduces a cold working by means of applying a severe force and this force is then backed off slightly to allow the molecules to reorientate themselves before the final cold work to the greater root diameter in zone three. This forms at least one wave 10 in the second zone.

In forming the wave on the root of zone two of the male member, it has been found desirable to stay a short distance below the pitch diameter PD of the male member, at least the waves should not be formed on a diameter which is greater than the pitch diameter. If the waves are formed on the diameter which is greater than the pitch diameter, the crest of the threads of the male member "wash out" in the third zone.

Referring to the third zone, it will be noted that the root 6 is located above the pitch diameter PD by an amount 6a. The maximum root diameter 6 in zone three, in accordance with the present invention, is of greater diameter than the normal pitch diameter PD by an amount which is a function of the particular pitch of the thread of the members. For example, with members having a pitch of the thread of from 4 to 19 threads per inch, the distance 6a in zone 3 is a maximum of 5 per cent (5%) of the pitch of the threads. In other words, the amount 6a which has been added over and above the normal, conventional pitch diameter PD of the thread, can only be a maximum of 5 per cent of the pitch value of the threads where the pitch of the threads is of 4 to 19 threads per inch. As another example, with the pitch of the thread being from 20 to 64 threads per inch, I have found that the maximum root distance added over mean conventional or mean published pitch diameter PD in zone three can be 10 per cent (10%) of the pitch value. That is to say, the amount 6a in zone three, for a pitch of the thread of from 20 to 64 threads per inch, can be a maximum of 10 per cent of the particular pitch of the thread being used. As a further example, if the pitch of the thread is from 65 to 80 threads per inch, the diameter of the root in zone three over the normal, conventional pitch diameter PD can be a maximum of thirteen per cent (13%) of this pitch value.

With the above maximum values of the diameter in zone three, which maximum is determined by a percentage of the pitch of the threads, I have found that the metal will not be fatigued, the threads will not be "wiped-out" in zone 3, and it is possible to drive the members together and have maximum holding power. Beyond the maximum limits as set forth above, it becomes impossible to drive the members together without wiping-out the threads in zone three and fatiguing the metal.

Thus, the present invention provides a male threaded member in which the maximum amount added over and above the conventional, published, or standard pitch diameter PD is determined by a percentage, or is a function of the pitch of the thread being used. Stated otherwise, the amount 6a (FIG. 1) added to the conventional pitch diameter PD is a maximum of five per cent (5%) of the pitch of the threads where the pitch of the threads is from 4 to 19 threads per inch; it is a maximum of ten per cent (10%) of the pitch value where the pitch of the threads is from 20 to 64 threads per inch; and the amount 6a added above the pitch diameter is a maximum of thirteen per cent (13%) of the pitch value where the pitch of the threads is from 65 to 80 threads per inch.

With the present invention it is possible to use the above said three zones in a male threaded member over a considerably shorter axial length and utilizing a smaller number of threads. The invention provides a maximum limit of the root diameter in the third zone, that is maximum amount the root diameter can be increased over and above the standard pitch diameter, which provide maximum holding power without fatiguing the metal or "wiping-out" the threads in the third zone, and at the same time insuring that the members can be properly driven together.

I claim:

1. A male thread form member having crests of generally constant uniform diameter throughout the major portion of its length and for being received in a standard female V-shaped thread form, said male member comprised of three axial zones along its length including a first initial engagement zone, a second zone having a thread root of progressively increasing diameter from said first zone, and a third zone, said thread root in said second zone also having its radially innermost portion formed with a gentle and gradual wave pattern which rises and falls in a direction along the circumferential length of the root, whereby cold working and deformation of said female thread form occurs in said second zone of said male member, the cross sectional shape of the crest of threads in said second zone being generally arcuate, said third zone having a root diameter which is greater than its normal pitch diameter by a maximum amount determined by a percentage of the pitch of the threads as follows: (a) for a pitch of the threads of from about 4 to 19 threads per inch, the maximum root diameter over its normal conventional pitch diameter is 5 per cent of the pitch of the threads; (b) for a pitch of the threads of from about 20 to 64 threads per inch, the maximum root diameter over its normal conventional pitch diameter is 10 per cent of the pitch of the threads; and (c) for a pitch of the threads of from about 65 to 80 threads per inch, the maximum root diameter over its normal conventional pitch diameter is 13 per cent of the pitch of the threads.

2. A male thread form member having crests of generally constant uniform diameter throughout the major portion of its length and for use in connection with a female threaded member having a generally standard female thread form of substantially V-shape cross section, said male thread form member being received in said female thread form and comprised of three axial zones along its length, said zones including a first initial engagement zone, a second zone having a thread root of progressively increasing diameter from said first zone, and a third zone, said thread root in said second zone also being formed with a gentle and gradual wave pattern which rises and falls in a direction along the circumferential length of the root whereby said root of said second zone is undulating in form at least during a portion of its length as it progressively increases from said first zone to said third zone, and cold working and deformation of said female thread form occurs in said second zone so that said female form fills the space between the threads of the male member in said third zone, said third zone having a root diameter which is greater than its normal pitch diameter by a maximum amount determined by a percentage of the pitch of the threads as follows: (a) for a pitch of the threads of from about 4 to 19 threads per inch, the maximum root diameter over its normal conventional pitch diameter is 5 per cent of the pitch of the threads; (b) for a pitch of the threads of from about 20 to 64 threads per inch, the maximum root diameter over its normal conventional pitch diameter is 10 per cent of the pitch of the threads; and (c) for a pitch of the threads of from about 65 to 80 threads per inch, the maximum root diameter over its normal conventional pitch diameter is 13 per cent of the pitch of the threads.

3. A member provided with a male thread form of substantially uniform axial pitch throughout the major portion of its length and also having crests of generally constant uniform diameter throughout the major portion of its length, said male thread form member being receivable in a female thread form, said male member comprised of three axial zones along its length, said zones including an initial engagement first zone with a root of substantially V-shape in cross section, a second zone having a root of generally progressively increasing diameter from said first zone, and a third zone, said thread root in said second zone also being formed with a gentle and gradual wave pattern which rises and falls in a direction along the circumferential length of the root whereby said root of said second zone is undulating in form for at least a portion of its length as it progressively increases from said first zone to said third zone, and cold working and deformation of said female thread form occurs in said second zone so that said female thread form fills the space between the threads of the male member in said third zone, said third zone having a root diameter which is greater than its normal pitch diameter by a maximum amount determined by a percentage of the pitch of the threads as follows: (a) for a pitch of the threads of from about 4 to 19 threads per inch, the maximum root diameter over its normal conventional pitch diameter is 5 per cent of the pitch of the threads; (b) for a pitch of the threads of from about 20 to 64 threads per inch, the maximum root diameter over its normal conventional pitch diameter is 10 per cent of the pitch of the threads; and (c) for a pitch of the threads of from about 65 to 80 threads per inch, the maximum root diameter over its normal conventional pitch diameter is 13 per cent of the pitch of the threads.

4. For use in connection with a threaded member having a generally standard female thread form of uniform axial pitch with roots and crests of substantially V-shape in cross section and having generally constant uniform diameter; a member provided with a male thread form of substantially corresponding uniform axial pitch throughout the major portion of its length and also having crests of generally constant uniform diameter throughout the major portion of its length, said male thread form being received in said female thread form and comprised of three axial zones along its length, said zones including an initial engagement first zone, with the root in said first zone being substantially V-shape in cross section, a second zone having a root of generally progressively increasing diameter from said first zone, and a third zone having a thread root generally corresponding to the diameter of the thread root at the terminal of the second zone, said thread root in said second zone also being flattened and formed with a gentle and gradual wave pattern which rises and falls in a direction along the circumferential length of the root whereby said root of said second zone is undulating in form at least for a portion of its length as it progressively increases from said first zone to said third zone, and cold working and deformation of said female thread form occurs in said second zone so that said female thread form fills the space between the threads of the male member in said third zone, said third zone having a root diameter which is greater than its normal pitch diameter by a maximum amount determined by a percentage of the pitch of the threads as follows: (a) for a pitch of the threads of from about 4 to 19 threads per inch, the maximum root diameter over its normal conventional pitch diameter is 5 per cent of the pitch of the threads; (b) for a pitch of the threads of from about 20 to 64 threads per inch, the maximum root diameter over its normal conventional pitch diameter is 10 per cent of the pitch of the threads; and (c) for a pitch of the threads of from about 65 to 80 threads per inch, the maximum root diameter over its normal conventional pitch diameter is 13 per cent of the pitch of the threads.

* * * * *